United States Patent
Ishizaki et al.

(10) Patent No.: US 12,534,683 B2
(45) Date of Patent: *Jan. 27, 2026

(54) MAGNETIC VISCOUS FLUID AND MECHANICAL DEVICE

(71) Applicant: SOMAR CORPORATION, Tokyo (JP)

(72) Inventors: Hirohisa Ishizaki, Tokyo (JP); Akira Ochiai, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/710,697

(22) PCT Filed: Nov. 18, 2022

(86) PCT No.: PCT/JP2022/042928
§ 371 (c)(1),
(2) Date: May 16, 2024

(87) PCT Pub. No.: WO2023/090437
PCT Pub. Date: May 25, 2023

(65) Prior Publication Data
US 2025/0011675 A1   Jan. 9, 2025

(30) Foreign Application Priority Data
Nov. 18, 2021 (JP) .................. 2021-187552

(51) Int. Cl.
*C10M 169/04* (2006.01)
*C10M 105/06* (2006.01)
(Continued)

(52) U.S. Cl.
CPC ...... *C10M 169/044* (2013.01); *C10M 105/06* (2013.01); *C10M 105/36* (2013.01);
(Continued)

(58) Field of Classification Search
CPC ............... F16F 9/535; F16F 2224/045; C10N 2040/08; C10N 2040/185; C10M 171/001;
(Continued)

(56) References Cited

U.S. PATENT DOCUMENTS

| 3,984,918 A | 10/1976 | Chaney |
| 4,976,883 A | 12/1990 | Kanno et al. |

(Continued)

FOREIGN PATENT DOCUMENTS

| JP | 2002-121578 A | 4/2002 |
| JP | 2006-521693 A | 9/2006 |

(Continued)

OTHER PUBLICATIONS

International Preliminary Report on Patentability and English translation of the Written Opinion of the International Searching Authority (Forms PCT/IB/373 and PCT/ISA/237) for International Application No. PCT/JP2022/042928, dated May 2, 2024.
(Continued)

*Primary Examiner* — Vishal V Vasisth
(74) *Attorney, Agent, or Firm* — Birch, Stewart, Kolasch & Birch, LLP

(57) ABSTRACT

The present invention provides a magnetic viscous fluid comprising a magnetic particle, at least one selected from ester base synthetic oil, ether base synthetic oil, and alkylnaphthalene having an alkyl group with 10 to 20 carbons, an inorganic cation exchanger with a siloxane bond, and silicone oil.

6 Claims, 2 Drawing Sheets

(51) Int. Cl.

| | | |
|---|---|---|
| *C10M 105/36* | (2006.01) | |
| *C10M 105/38* | (2006.01) | |
| *C10M 107/34* | (2006.01) | |
| *C10M 125/12* | (2006.01) | |
| *C10M 125/30* | (2006.01) | |
| *C10M 155/02* | (2006.01) | |
| *C10M 161/00* | (2006.01) | |
| *H01F 1/44* | (2006.01) | |
| *C10N 40/08* | (2006.01) | |
| *C10N 50/00* | (2006.01) | |

(52) U.S. Cl.
CPC ........ *C10M 105/38* (2013.01); *C10M 107/34* (2013.01); *C10M 125/12* (2013.01); *C10M 125/30* (2013.01); *C10M 155/02* (2013.01); *C10M 161/00* (2013.01); *H01F 1/447* (2013.01); *C10M 2201/064* (2013.01); *C10M 2201/103* (2013.01); *C10M 2203/065* (2013.01); *C10M 2207/2825* (2013.01); *C10M 2207/2835* (2013.01); *C10M 2209/1085* (2013.01); *C10M 2229/041* (2013.01); *C10N 2040/08* (2013.01); *C10N 2050/015* (2020.05)

(58) Field of Classification Search
CPC ............ C10M 169/044; C10M 105/38; C10M 107/02; C10M 111/04; C10M 125/12; C10M 125/26; C10M 127/06; C10M 141/00; C10M 155/02; C10M 161/00; C10M 2201/064; C10M 2201/102; C10M 2203/06; C10M 2205/0206; C10M 2207/2835; C10M 2229/02
See application file for complete search history.

(56) References Cited

U.S. PATENT DOCUMENTS

| | | | | |
|---|---|---|---|---|
| 5,507,967 | A * | 4/1996 | Fujita | ............... H01F 1/442 252/62.52 |
| 5,516,445 | A * | 5/1996 | Sasaki | ........... C10M 171/001 428/407 |
| 5,702,630 | A * | 12/1997 | Sasaki | ........... C10M 171/001 252/62.55 |
| 8,182,712 | B1 | 5/2012 | Maekawa et al. | |
| 2002/0130305 | A1* | 9/2002 | Iyengar | .......... C10M 171/001 252/570 |
| 2004/0119045 | A1 | 6/2004 | Hata et al. | |
| 2004/0195540 | A1 | 10/2004 | Tsuda et al. | |
| 2005/0087408 | A1* | 4/2005 | Namuduri | ........... F16F 9/535 188/267.1 |
| 2011/0121223 | A1* | 5/2011 | Ulicny | ............... H01F 1/447 252/62.52 |
| 2011/0166051 | A1* | 7/2011 | Mizrahi | ........... C10M 161/00 428/407 |
| 2013/0126798 | A1 | 5/2013 | Nakatani | |
| 2019/0040924 | A1* | 2/2019 | Komori | ............... F16C 17/12 |
| 2020/0234859 | A1 | 7/2020 | Yamada et al. | |
| 2020/0312504 | A1 | 10/2020 | Ishizaki et al. | |
| 2021/0398721 | A1* | 12/2021 | Sakamoto | ........... H01F 1/442 |

FOREIGN PATENT DOCUMENTS

| | | |
|---|---|---|
| JP | 2006-303182 A | 11/2006 |
| JP | 2013-127013 A | 6/2013 |
| JP | 2016-213301 A | 12/2016 |
| JP | WO2017/047681 A1 | 3/2017 |
| JP | 2017-92119 A | 5/2017 |
| JP | 2017-92120 A | 5/2017 |
| JP | 2019-33221 A | 2/2019 |
| JP | 2019-33222 A | 2/2019 |
| JP | 2020-105449 A | 7/2020 |
| JP | 2021-163969 A | 10/2021 |
| KR | 10-2001-0024058 A | 3/2001 |
| KR | 10-2010-0081799 A | 7/2010 |
| KR | 10-2016-0145666 A | 12/2016 |
| KR | 10-2017-0068137 A | 6/2017 |
| TW | 202041658 A | 11/2020 |
| WO | WO 02/095773 A1 | 11/2002 |
| WO | WO 2004/086426 A1 | 10/2004 |
| WO | WO 2023/008359 A1 | 2/2023 |

OTHER PUBLICATIONS

International Preliminary Report on Patentability and English translation of the Written Opinion of the International Searching Authority (Forms PCT/IB/338, PCT/IB/373 and PCT/ISA/237) for International Application No. PCT/JP2022/042929, dated May 30, 2024.
International Search Report (Form PCT/ISA/210) for International Application No. PCT/JP2022/042929, dated Jan. 31, 2023, with an English translation.
Taiwanese Office Action and Search Report for Taiwanese Application No. 111144069, dated May 27, 2024, with an English translation.
International Search Report (PCT/ISA/210), issued in PCT/JP2022/042928, dated Jan. 31, 2023.
Korean Office Action for corresponding Korean Application No. 10-2024-7018216, dated Jul. 16, 2024, with an English translation.
Korean Office Action for Korean Application No. 10-2024-7018215, dated Jul. 16, 2024, with an English translation.
Taiwanese Office Action and Search Report for corresponding Taiwanese Application No. 111144068, dated Jul. 9, 2024, with an English translation.
German Office Action for corresponding German Application No. 11 2023 000 290.8, dated Oct. 28, 2024, with English translation.
International Search Report for PCT/JP2023/039518 (PCT/ISA/210) mailed on Dec. 26, 2023.
Shin-Etsu Silicone, 2025, https://www.shinetsusilicone-global.com/info/begin4.shtml>, 1 page total.
U.S. Office Action for U.S. Appl. No. 18/695,285, dated Feb. 11, 2025.
U.S. Office Action for U.S. Appl. No. 18/695,285, dated Nov. 29, 2024.
U.S. Office Action for U.S. Appl. No. 18/695,285, dated Sep. 19, 2024.
Written Opinion of the International Searching Authority for PCT/JP2023/039518 (PCT/ISA/237) mailed on Dec. 26, 2023.
U.S. Office Action for U.S. Appl. No. 18/695,285, dated Jun. 3, 2025.
U.S. Notice of Allowance for U.S. Appl. No. 18/695,285, dated Sep. 23, 2025.
U.S. Notice of Allowance for U.S. Appl. No. 18/711,269, dated Oct. 28, 2025.
"Viscosities of Various Liquids," URL: https://www.csidesigns.com/uploads/resources/Viscosity-Chart.pdf, 2025, 1 page total.
U.S. Advisory Action for U.S. Appl. No. 18/695,285, dated Jul. 23, 2025.
U.S. Office Action for U.S. Appl. No. 18/711,269, dated Jul. 22, 2025.

* cited by examiner

MAGNETIC VISCOUS FLUID AND MECHANICAL DEVICE

This application is a 371 of PCT/JP2022/042928, filed Nov. 18, 2022.

FIELD OF THE INVENTION

The present invention relates to a magnetic viscous fluid and a mechanical device. In particular, it relates to a magnetic viscous fluid for use of controlling frictional forces acting between objects in various mechanical devices such as brakes, clutches, and dampers of anti-vibration devices or vibration suppression devices.

BACKGROUND OF THE INVENTION

A magnetic viscous (Magneto-Rheological (MR)) fluid is a fluid in which magnetic particles, which are magnetizable metal particles, are dispersed in a dispersion medium. When no magnetic field is applied to a magnetic viscous fluid, magnetic particles are randomly suspended in the dispersion medium and it functions as a fluid. On the other hand, when a magnetic field is applied to the magnetic viscous fluid, the magnetic particles form numerous clusters and thicken, causing an internal stress to increase.

The magnetic viscous fluid acts like a rigid body due to the increase in the internal stress described above, and exhibits drag force against shear flow and pressure flow. Because of having these characteristics, the magnetic viscous fluid is used in various mechanical devices to control the frictional force between objects in the mechanical devices such as brakes, clutches, and dampers of anti-vibration devices or vibration suppression devices.

Therefore, it is preferable to have a large drag force (hereinafter referred to as "drag force during excitation") against shear flow and pressure flow when a magnetic field is applied to the magnetic viscous fluid (during excitation). The drag force during excitation is evaluated by measuring torque value, viscosity, or shear stress, and others. In this specification, drag force during excitation is evaluated by measuring viscosity during excitation.

In addition, since the frictional force between objects in various mechanical devices such as brakes, clutches, and dampers of anti-vibration devices or vibration suppression devices is stable, it is preferable that the aging stability of drag force during excitation is excellent.

Patent Literature 1 discloses a magnetic viscous fluid, in which magnetic particles, a clay mineral-based dispersion stabilizer, and a surfactant are contained in predetermined amounts in a carrier fluid.

CITATION LIST

Patent Literatures

[Patent Literature 1] Japanese Patent Application Publication No. 2002-121578 A

SUMMARY OF THE INVENTION

The magnetic viscous fluid described in Patent Literature 1 has a small and unsatisfactory drag force during excitation. The magnetic viscous fluid was also unsatisfactory in terms of the aging stability of drag force during excitation. Thus, the development of the magnetic viscous fluid with excellent drag force during excitation and excellent aging stability of drag force is long awaited.

The present invention is developed in view of the above points. The purpose of the present invention is to provide a magnetic viscous fluid with excellent drag force during excitation and excellent aging stability of drag force and a mechanical device.

The above problem is solved by the following present invention, and the present invention is specified as following (1) to (8):

(1) A magnetic viscous fluid comprising:
 a magnetic particle,
 at least one selected from ester base synthetic oil, ether base synthetic oil, and alkylnaphthalene having an alkyl group with 10 to 20 carbons,
 an inorganic cation exchanger with a siloxane bond, and silicone oil.

(2) The magnetic viscous fluid according to (1),
 wherein the ester base synthetic oil is at least one selected from polyol ester and dibasic acid ester.

(3) The magnetic viscous fluid according to (2),
 wherein the polyol ester is hindered ester.

(4) The magnetic viscous fluid according to (2),
 wherein the dibasic acid ester is aliphatic dibasic acid ester.

(5) The magnetic viscous fluid according to (4),
 wherein the aliphatic dibasic acid ester is ester of aliphatic dicarboxylic acid with 2 to 10 carbons and alcohol with 1 to 10 carbons.

(6) The magnetic viscous fluid according to (1),
 wherein the ether base synthetic oil is polyalkylene glycols.

(7) The magnetic viscous fluid according to (6),
 wherein the polyalkylene glycols are at least one selected from the group consisting of compounds represented by the following formula (1);

$$R^1\text{—}O\text{—}(R^2\text{—}O)_n\text{—}R^3 \quad (1)$$

[in the formula (1), $R^1$ and $R^3$ may be the same or different, each indicating a hydrogen atom or an alkyl group with 1 to 18 carbons, $R^2$ indicates an alkylene group with 2 to 4 carbons, and n indicates an integer from 2 to 30.]

(8) A mechanical device comprising the magnetic viscous fluid according to any one of (1) to (7).

According to an embodiment of the present invention, it is possible to provide a magnetic viscous fluid with excellent drag force during excitation and excellent aging stability of drag force and a mechanical device.

DETAILED DESCRIPTION OF THE INVENTION

Hereinafter, embodiments of a magnetic viscous fluid and a mechanical device according to the present invention will be described. It is to understand that the present invention is not limited to the following embodiments, and various changes, modifications and improvements may be made based on ordinary knowledge of a person skilled in the art, without departing from the scope of the present invention.

In this specification, a symbol of "~" representing a numerical value range indicates a range that includes the numerical values listed as the upper and lower limits of the range, respectively. When units are listed only for the upper limit in a numerical value range, it means that the lower limit is also in the same units as the upper limit.

In the numerical value ranges described herein in steps, the upper or lower limits described in a certain numerical value range may be replaced by the upper or lower limits of the other stepwise described numerical value range.

In the numerical value ranges described herein, the upper or lower limits described in a certain numerical value range may be replaced by the values shown in the Examples.

In this specification, a content rate or a content amount of each component in a composition means, when multiple substances corresponding to each component are present in the composition, the total content rate or content amount of such multiple substances present in the composition, unless otherwise specified.

(Magnetic Viscous Fluid)

The magnetic viscous fluid of the present embodiment contains a magnetic particle, specific base oil, an inorganic cation exchanger with a siloxane bond, and silicone oil. Due to this configuration, the magnetic viscous fluid of the present embodiment has excellent drag force during excitation and excellent aging stability of drag force. The reasons for this are explained below, using hindered ester which is a type of ester base synthetic oil, and dimethyl silicone oil which is a type of silicone oil, as examples.

Figure 1:
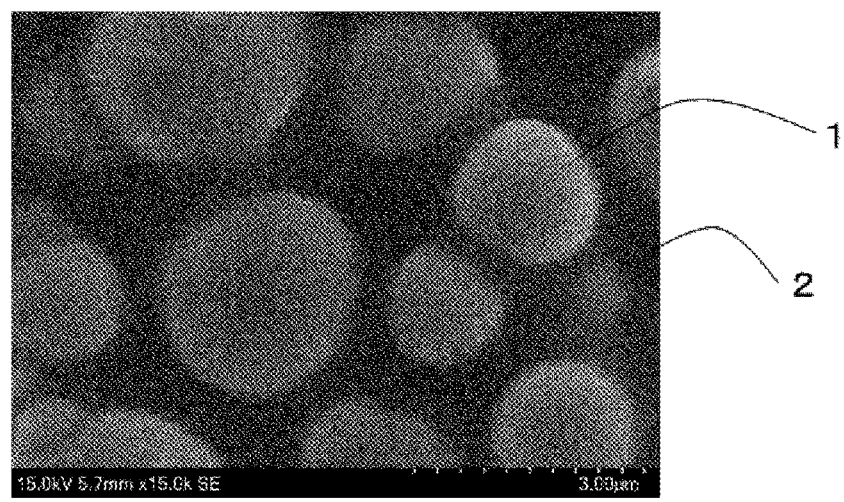
FIG. 1 shows an electron micrograph (magnification: 15,000×) of the magnetic viscous fluid of Example 1, taken with a scanning electron microscope.
Figure 2:
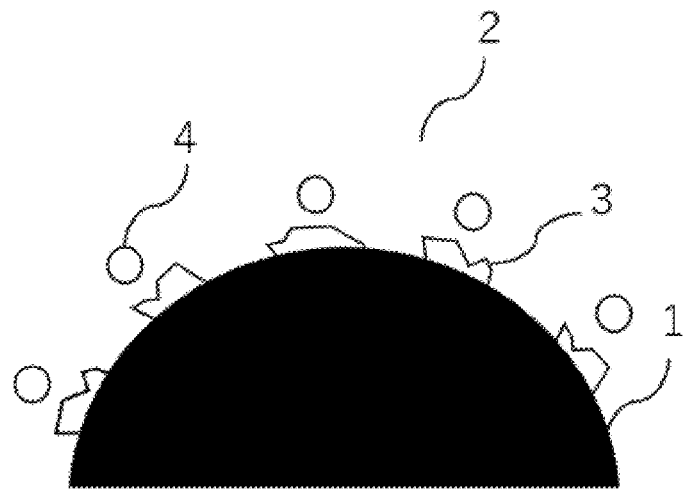
FIG. 2 shows a schematic diagram of an enlarged part of magnetic particles in the magnetic viscous fluid of Example 1.

Magnetic particle 1 is dispersed in hindered ester 2 (see FIG. 1). The surface of magnetic particle 1 is assumed to be in the following state. That is, magnetic particle 1 is cationic and adsorbs an inorganic cation exchanger with a siloxane bond 3. Dimethyl silicone oil 4 which has a low surface energy is dispersed without dissolving in hindered ester 2 which has a high solubility parameter. Furthermore, inorganic cation exchanger with a siloxane bond 3 and dimethyl silicone oil 4 have a high affinity because they both have a siloxane bond, and dimethyl silicone oil 4 is assumed to exist in a state surrounding magnetic particle 1 with inorganic cation exchanger with a siloxane bond 3 adsorbed (see FIG. 2).

When a magnetic field is applied in this state, magnetic particles 1 surrounded by dimethyl silicone oil 4 quickly combine and cluster. The presence of dimethyl silicone oil 4 around magnetic particle 1 prevents excessive agglomeration of magnetic particle 1. Therefore, when a magnetic field is applied and drag force (viscosity) is measured, although shear force is generated, clusters do not collapse and their drag forces remain high and stable, which is assumed to result in a magnetic viscous fluid with excellent drag force during excitation and excellent aging stability of drag force.

The followings are descriptions of each component in the magnetic viscous fluid of the present embodiment.

1. Magnetic Particle

The magnetic particles included in the magnetic viscous fluid of the present embodiment can be selected according to a desired magnetic permeability. For example, ferromagnetic oxides such as magnetite, carbonyl iron, gamma iron oxide, manganese ferrite, cobalt ferrite, or composite ferrite with zinc or nickel, barium ferrite, and others. ferromagnetic metals such as iron, cobalt, and rare earths and others; nitride metals; various alloys such as Sendust (registered trademark), Permalloy (registered trademark), Super Permalloy (registered trademark), and others. Among these, carbonyl iron is preferred in that it is a soft magnetic material with low coercive force and high permeability. Carbonyl iron is a high-purity metallic particle produced by thermal decomposition of pentacarbonyl iron ($Fe(CO)_5$).

One type of the magnetic particle may be used alone, or two or more may be used in combination.

In the magnetic viscous fluid of the present embodiment, when an external magnetic field is applied, dispersed magnetic particles are oriented in the direction of the magnetic field to form chain-like clusters, thereby thickening the fluid and changing its flow characteristics and yield stress. An average particle diameter of the magnetic particles is determined so that they exhibit such behaviors. Specifically, the range of 0.1 to 100 μm is preferred. The lower limit of the average particle diameter of the magnetic particles is more preferably 1 μm or more, even more preferably 5 μm or more, and even more preferably 10 μm or more. The upper limit of the average particle diameter of the magnetic particles is more preferably 80 μm or less, even more preferably 60 μm or less, even more preferably 50 μm or less, and even more preferably 40 μm or less. A shape of the magnetic particles is preferably spherical or nearly spherical to facilitate dispersion.

The average particle diameter of the magnetic particles is an average primary particle diameter as measured by a laser diffraction/scattering particle size distribution analyzer.

A content rate of the magnetic particles is preferably in the range of 30 to 90 mass % of the total amount of the magnetic viscous fluid of the present embodiment. By setting the content rate of the magnetic particles in the range of 30 to 90 mass % of the total amount of the magnetic viscous fluid of the present embodiment, a necessary drag force can be obtained when a magnetic field is applied, and a dispersibility of the magnetic particles can be maintained, thereby the magnetic viscous fluid also functions as a fluid. The lower limit of the content rate of the magnetic particles is more preferably 40 mass % or more, even more preferably 45 mass % or more, and even more preferably 50 mass % or more. The upper limit of the content rate of the magnetic particles is more preferably 85 mass % or less, even more preferably 80 mass % or less, even more preferably 75 mass % or less.

2. Base Oil

The base oil included in the magnetic viscous fluid of the present embodiment is at least one selected from ester base synthetic oil, ether base synthetic oil and alkylnaphthalene having an alkyl group with 10 to 20 carbons. Hereinafter, unless otherwise specified, the term "base oil" simply means any of the following: ester base synthetic oil, ether base synthetic oil, and alkylnaphthalene having alkyl group with 10 to 20 carbons. One type of the base oil may be used alone, or two or more may be used in combination.

2-1. Ester Base Synthetic Oil

The ester base synthetic oil includes, for example, monoesters, polyol esters, dibasic acid esters (diesters), and polyoxyalkylene glycol esters, and others. Among these, monoesters with 12 to 30 carbons are preferred, for example, 2-ethylhexyl laurate, 2-ethylhexyl palmitate, n-butyl stearate, and others. Polyol esters are esters of polyhydric alcohols (polyols) and linear or branched-chain saturated or unsaturated fatty acids. Examples of polyol esters include hindered esters. One of these ester base synthetic oils may be used alone, or two or more may be used in combination.

<Hindered Ester>

Hindered ester, a type of ester base synthetic oil included in the magnetic viscous fluid of the present embodiment, will be explained in detail below.

The hindered ester is an ester of a hindered polyol having one or more quaternary carbons in the molecule and one to four methylol groups bonded to at least one of the quaternary carbons, and an aliphatic monocarboxylic acid. One of the hindered esters may be used alone, or two or more may be used in combination.

Hindered polyols include, for example, trimethylolpropane (TMP), pentaerythritol (PE), dipentaerythritol (DPE), neopentylglycol (NPG), 2-methyl-2-propyl-1,3-propanediol (MPPD), and others. Among these hindered polyols, trimethylolpropane, pentaerythritol, and dipentaerythritol are preferred because of a higher flash point of a resulting hindered ester. Trimethylolpropane is more preferred because of a lower flow point of a resulting hindered ester.

Aliphatic monocarboxylic acids with 5-15 carbons are preferred. The acyl groups of the aliphatic monocarboxylic acids may be linear or branched-chain.

The aliphatic group of aliphatic monocarboxylic acid may be either an aliphatic saturated hydrocarbon group (alkyl group) or an aliphatic unsaturated hydrocarbon group. Examples of the aliphatic monocarboxylic acids include saturated aliphatic monocarboxylic acids such as valeric acid (pentanoic acid), caproic acid (hexanoic acid), enanthate (heptanoic acid), caprylic acid (octanoic acid), perargonic acid (nonanoic acid), capric acid (decanoic acid), undecanoic acid, lauric acid (dodecanoic acid), tridecanoic acid, myristic acid (tetradecanoic acid), and pentadecanoic acid, and others; and unsaturated aliphatic carboxylic acids such as pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, fisetelic acid, undecylenic acid, linderic acid, sorbic acid, and others. One of these aliphatic monocarboxylic acids may be used alone or in combination with two or more of them during esterification. The carbon number of the aliphatic monocarboxylic acid is more preferably 6 or more. The carbon number of the aliphatic monocarboxylic acid is more preferably 5 or more because of a higher flash point of a resulting hindered ester. The number of carbons of the aliphatic monocarboxylic acid is more preferably 12 or less. The number of carbons of the aliphatic monocarboxylic acid is particularly preferably 10 or less. The number of carbons of the aliphatic monocarboxylic acid is preferably 15 or less because of an improved solubility parameter of a resulting hindered ester.

Unless otherwise mentioned, the carbon number of aliphatic monocarboxylic acid in the present invention includes the carbon atom of the carboxy group (—COOH) possessed by the aliphatic monocarboxylic acid.

<Dibasic Acid Ester>

The dibasic acid esters, a type of ester base synthetic oil included in the magnetic viscous fluid of the present embodiment, will be explained in detail below.

The dibasic acid esters include esters of dicarboxylic acids with 2 to 10 carbon atoms and alcohols with 1 to 10 carbon atoms.

The dicarboxylic acids with 2 to 10 carbon atoms include, for example, aliphatic dicarboxylic acids such as oxalic acid, malonic acid, succinic acid, glutaric acid, 2-methylglutaric acid, adipic acid, pimelic acid, suberic acid, azelaic acid, and sebacic acid, and others, and aromatic dicarboxylic acids such as phthalic acid, isophthalic acid, and terephthalic acid, and others.

The alcohols with 1 to 10 carbon atoms include methanol, ethanol, propanol, isopropanol, butanol, isobutanol, hexanol, octanol, 2-ethyl hexanol, isononyl alcohol, decyl alcohol and isodecyl alcohol, and others.

More specifically, diisobutyl adipate, di(2-ethylhexyl) adipate, diisodecyl adipate, diisobutyl sebacate, di(2-ethylhexyl) sebacate, diisodecyl sebacate, diisobutyl phthalate, di(2-ethylhexyl) phthalate, diisodecyl phthalate, and others, are included.

Among these, aliphatic dibasic acid esters, which are esters of aliphatic dicarboxylic acids with 2 to 10 carbon atoms and alcohols with 1 to 10 carbon atoms, are preferred because they provide more excellent aging stability of drag force during excitation.

Among the above aliphatic dibasic acid esters, esters of aliphatic dicarboxylic acids with 6 to 10 carbon atoms such as diisobutyl adipate, di(2-ethylhexyl) adipate, diisodecyl adipate, and di(2-ethylhexyl) sebacate, and alcohols with 4 to 10 carbon atoms are preferred. In particular, dibasic acid esters, which are esters of aliphatic dicarboxylic acids with 6 to 10 carbon atoms, such as diisobutyl adipate, di(2-ethylhexyl) adipate, di(2-ethylhexyl) sebacate, and alcohols with 4 to 8 carbon atoms are preferred. One of these dicarboxylic acids and alcohols may be used alone or in combination with two or more of them during esterification.

Unless otherwise mentioned, the carbon number of aliphatic dicarboxylic acid in the present invention includes the carbon atom of the carboxy group (—COOH) of the aliphatic dicarboxylic acid. Unless otherwise mentioned, the carbon number of the aromatic carboxylic acid in the present invention also includes the carbon atom of an aromatic ring possessed by the aromatic carboxylic acid. One of these dibasic acid esters may be used alone or in combination with two or more of them.

2-2. Ether Base Synthetic Oil

Examples of ether base synthetic oil include polyvinyl ethers, polyalkylene glycols, polyphenyl ethers, perfluoroethers, and others. One of these ether base synthetic oils may be used alone or in combination with two or more of them.

<Polyalkylene Glycols>

Polyalkylene glycols, a type of ether base synthetic oil included in the magnetic viscous fluid of the present embodiment, will be explained in detail below.

The polyalkylene glycols are preferably at least one selected from the group consisting of compounds represented by the following formula (1).

$$R^1\text{—}O\text{—}(R^2\text{—}O)_n\text{—}R^3 \qquad (1)$$

In the formula (1), $R^1$ and $R^3$ may be the same or different, each indicating a hydrogen atom or an alkyl group with 1 to 18 carbons, $R^2$ indicates an alkylene group with 2 to 4 carbons, and n indicates an integer from 2 to 30.

When both $R^1$ and $R^3$ in the formula (1) are hydrogen atoms, the compound represented by the formula (1) above is a polyalkylene glycol. When either $R^1$ or $R^3$ in the formula (1) is a hydrogen atom, the compound represented by the formula (1) is a monoetheride of polyalkylene glycol. When both $R^1$ and $R^3$ in the formula (1) are alkyl groups, the compound represented by the formula (1) is a polyalkylene glycol dietheride.

When one or both of $R^1$ and $R^3$ in the formula (1) are alkyl groups, the number of carbons in the alkyl group is preferably from 5 to 18, more preferably from 6 to 15, and especially preferably from 8 to 14.

By setting the number of carbons in the alkyl group to 5 or more, the viscosity during excitation is expected to increase due to its polarity.

From the viewpoint of availability, the number of carbons in the alkyl group is preferably 18 or less. The alkyl group may be linear or branched. Specifically, the alkyl group includes methyl group, ethyl group, n-propyl group, isopropyl group, n-butyl group, isobutyl group, sec-butyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group, and others.

The carbon number of the alkylene group represented by $R^2$ in the formula (1) is preferably 2 to 4. When the number of carbons of the alkylene group is 2 to 4, the viscosity before excitation can be reduced. Examples of alkylene groups with the carbon number is 2 to 4 are specifically ethylene group, propylene group (including 1-methylethylene group and 2-methylethylene group), trimethylene group, butylene group, (1-ethylethylene group and 2-ethylethylene groups), 1,2-dimethylethylene groups, 2,2-dimethylethylene groups, 1-methyltrimethylene groups, 2-methyltrimethylene group, 3-methyltrimethylene group, tetramethylene group, and others.

The compound represented by the formula (1) may be a monopolymer having one type of $R^2$ in the same molecule or a copolymer having two or more types of $R^2$ in the same molecule. Furthermore, when the compound represented by the formula (1) is a copolymer, the monomer ratio and monomer arrangement constituting the copolymer are not particularly limited and may be a random copolymer, an alternating copolymer, or a block copolymer.

The n in the formula (1) is preferably an integer in the range of 2 to 30, more preferably an integer in the range of 5 to 30, and especially preferably an integer in the range of 7 to 15.

2-3. Alkylnaphthalene Having Alkyl Groups with 10 to 20 Carbons

Alkylnaphthalenes having alkyl groups with 10 to 20 carbons include, for example, decylnaphthalene, undecylnaphthalene, dodecylnaphthalene, tridecylnaphthalene, tetradecylnaphthalene, pentadecylnaphthalene, hexadecylnaphthalene, heptadecylnaphthalene, octadecylnaphthalene, nonadecylnaphthalene, icosylnaphthalene, di(decyl) naphthalene, di(undecyl)naphthalene, di(dodecyl) naphthalene, di(tridecyl)naphthalene, di(tetradecyl)naphthalene, di(pentadecyl)naphthalene, di(hexadecyl)naphthalene, di(heptadecyl)naphthalene, di(octadecyl)naphthalene, di(nonadecyl) naphthalene, di(icosyl)naphthalene.

In addition, all of these isomers may be included. One of these alkylnaphthalenes having alkyl groups with 10 to 20 carbons may be used alone or in combination with two or more of them.

The lower limit of a solubility parameter of the base oil is preferably 8.5 $(cal/cm^3)^{1/2}$, more preferably 8.8 $(cal/cm^3)^{1/2}$, and particularly preferably 9.0 $(cal/cm^3)^{1/2}$. The upper limit of the solubility parameter of the base oil is preferably 12.0 $(cal/cm^3)^{1/2}$, more preferably 11.0 $(cal/cm^3)^{1/2}$, and particularly preferably 10.0 $(cal/cm^3)^{1/2}$. The solubility parameter of 8.5 $(cal/cm^3)^{1/2}$ or more is more desirable in that it allows the base oil to be incompatible with the silicone oil described below.

The solubility parameter of 12.0 $(cal/cm^3)^{1/2}$ or less is more desirable in that it improves the heat resistance of the base oil.

The solubility parameter (SP value) can be calculated according to the method proposed by Fedors et al, "Polymer Engineering and Science, 14, 147-154 (1974)".

That is, it can be calculated based on the following equation.

$$\text{SP value } \delta = (\Sigma \Delta e / \Sigma \Delta v)^{1/2}$$

(In the above formula, $\Delta e$ is the evaporation energy of each atom or atomic group at 25° C. and $\Delta v$ is the molar volume of each atom or atomic group at the same temperature.)

A kinematic viscosity of the base oil at 40° C. is preferably 50.0 $mm^2/s$ or less, and more preferably in a range of 5.0 to 40.0 $mm^2/s$. It is preferred that the kinematic viscosity of the base oil at 40° C. be 50.0 $mm^2/s$ or less, as this makes it easier to disperse the magnetic particles.

The kinematic viscosity is a kinematic viscosity measured by the JIS K2283:2000 kinematic viscosity test method.

A flash point of the base oil is preferably 200° C. or higher, and more preferably 250° C. or higher.

If the flash point of the base oil is 200° C. or higher, the classification under the Fire Service Law is changed from Class 3 Petroleum to Class 4 Petroleum, which is more desirable because it allows for an increase in the amount of hazardous materials handled (designated quantity). The flash point is a flash point measured in accordance with JIS K2265-4:2007 (Cleveland Open (COC) method).

A flow point of the base oil is preferably −10° C. or lower, more preferably −20° C. or lower, particularly preferably −30° C. or lower, and most preferably −50° C. or lower. The flow point of −10° C. or lower is preferred for its excellent low-temperature flowability. The flow point is a flow point measured in accordance with JIS K2269:1987.

The lower limit of the base oil content is preferably 10 mass % or more, and more preferably 20% or more of the total amount of the magnetic viscous fluid of the present embodiment. By setting the base oil content to 10 mass % or more, magnetic particles can be dispersed and flowability can be improved. The upper limit of the base oil content is preferably 70% or less, and more preferably 60 mass % or less of the total amount of the magnetic viscous fluid of the present embodiment. Setting the base oil content to 70 mass % or less is more preferable in that it improves the magnetic properties during excitation.

The magnetic viscous fluid of the present embodiment may contain base oils other than ester base synthetic oils, ether base synthetic oils, and alkylnaphthalenes having alkyl groups with 10 to 20 carbons, such as mineral oils, polyalpha olefins, alpha olefins, and others to the extent that the effects of the present invention are not impaired.

3. Inorganic Cation Exchanger with Siloxane Bond

Because the magnetic viscous fluid of the present embodiment contains an inorganic cation exchanger with siloxane bonds and silicone oil described below, the drag force during excitation of the magnetic viscous fluid is increased and the aging stability of drag force is also improved.

More specifically, the magnetic particles are dispersed in the base oil. Since the magnetic particles have cationic properties, they adsorb inorganic cation exchangers with siloxane bonds. In addition, silicone oil is dispersed without dissolving in the base oil, which has a low surface energy and a high solubility parameter. Furthermore, the inorganic cation exchanger with siloxane bond and silicone oil has high affinity because both have Si, and silicone oil is assumed to exist in a state surrounding the magnetic particles adsorbed with the inorganic cation exchanger with siloxane bond.

When a magnetic field is applied in this state, magnetic particles surrounded by silicone oil quickly combine and cluster together. The presence of silicone oil around the magnetic particles prevents excessive aggregation of the magnetic particles. Therefore, when the drag force (viscosity) is measured by applying a magnetic field, shear force is generated, but the clusters do not collapse, and the drag force is high and stable. It is presumed that this will result in a magnetic viscous fluid with a large drag force during excitation and excellent aging stability of drag force.

<Inorganic Cation Exchanger with Siloxane Bond>

Inorganic cation exchangers with siloxane bond include, for example, zeolite, silica, layered silicate, and others. Among these, zeolite is preferred for its wear resistance. One type of the inorganic cation exchanger with siloxane bond may be used alone or in combination with two or more types. Both natural and synthetic products can be used.

Zeolite is composed of a crystalline porous aluminosilicate backbone with anionic properties and a cationic metal element M adsorbed on the backbone. More specifically, the basic structural unit is $SiO_4$ and $AlO_4$, which have a tetrahedral structure, and these are connected three-dimensionally to form a crystal with pores (voids), and crystal water and cationic metallic element M are adsorbed in these voids. The crystal structure of zeolite is not limited to, specifically A-type zeolite, X-type zeolite, Y-type zeolite, L-type zeolite, beta zeolite, ZSM-5, ZSM-11, silicalite, ferrierite, mordenite, clinoptilolite, porringite, and others.

The layered silicate is a silicate compound that has a crystal structure consisting of planes composed of ionic bonds and other factors that are weakly bonded to each other and stacked in layers. The layered silicate often has a negative charge throughout the layers, and large cations enter between the layers to neutralize the negative charge. Because of the small layer charge, these cations are exchangeable with cations in solution and have cation-exchange properties. The layered silicate includes, for example, the smectite group (bentonite, montmorillonite, bidelite, nontronite, saponite, hectorite, and stevensite), vermiculite, kaolin group (kaolinite, halloysite, chrysotile, amesite), mica group (muscovite, biotite, ferric mica, phlogopite, albite, soda mica, siderophyllite, yeastite, polylithiotite, trilithiotite, lithian mica, chinwald mica, margarite, illite, sea curbstone), talc, parigorskite, sepiolite, magadiite, kanemite, kenyaite, and synthetic fluorimica, and others. Among these, the smectite group, vermiculite, and synthetic fluorimica are preferred in terms of ion exchange capacity.

A cation exchange capacity of the inorganic cation exchanger with siloxane bond is preferably 30 meq/100 g or more, more preferably 60 meq/100 g or more, particularly preferably 150 meq/100 g or more.

A cation exchange capacity of the inorganic cation exchanger with siloxane bond is preferably 400 meq/100 g or less, more preferably 350 meq/100 g or less, particularly preferably 300 meq/100 g or less.

The cation exchange capacity of the inorganic cation exchangers with siloxane bond is 260 meq/100 g for mordenite, 120 meq/100 g for synthetic fluorimica, 60 to 150 meq/100 g for smectite group, 80 to 150 meq/100 g for montmorillonite, and 100 to 150 meq/100 g for vermiculite.

A lower limit of a content rate of the inorganic cation exchanger with siloxane bond is preferably 0.8 mass % or more, more preferably 1.0 mass % or more, particularly preferably 1.3 mass % or more, of the total magnetic viscous fluid of the present embodiment. The content rate of 0.8 mass % or less is more desirable in that it can suppress the agglomeration of magnetic particles in the absence of an applied magnetic field.

The upper limit of the content rate of the inorganic cation exchanger with siloxane bond is preferably 4.0 mass % or less, more preferably 3.5 mass % or less, and even more preferably 3.0 mass % or less, of the total magnetic viscous fluid of the present embodiment. The content rate of 4.0 mass % or less is more preferable in that it allows the proper formation of clusters of magnetic particles when a magnetic field is applied.

4. Silicone Oil

Silicone oil can be used without restriction as long as it is incompatible with the base oil. Silicone oil can be broadly classified into straight silicone oil and modified silicone oil. Straight silicone oil includes dimethyl silicone oil, methyl phenyl silicone oil, and methyl hydrogensilicone oil. Modified silicone oil includes reactive silicone oil and non-reactive silicone oil. Reactive silicone oil includes, for example, amino-modified types, epoxy-modified types, carboxy-modified types, carbinol-modified types, methacryl-modified types, mercapto-modified types, phenolic-modified types, and other types of silicone oil. Non-reactive silicone oil includes polyether-modified types, methylstyryl-modified types, alkyl-modified types, higher fatty acid ester-modified types, hydrophilic specially modified types, higher fatty acids containing types, fluorine-modified types, and others. Among these, dimethyl silicone oil and fluorine-modified type silicone oil are preferred because of their low surface energy, and dimethyl silicone oil is more preferred for ease of availability.

The lower limit of the silicone oil content rate is preferably 0.5 mass % or more, and more preferably 1.0 mass % or more, of the total amount of the magnetic viscous fluid of the present embodiment. The content rate of 0.5 mass % or more is preferred in that it can surround the magnetic particles to which the inorganic cation exchanger with siloxane bond is attached.

The upper limit of the silicone oil content rate is preferably 3.0 mass % or less, and more preferably 2.5 mass % or less. The content rate of 3.0 mass % or less is preferred in that it can prevent a decrease in the dispersibility of the magnetic particles.

The mixing ratio of the inorganic cation exchanger with siloxane bond and silicone oil is preferably in the range of 2:8 to 8:2 by mass, and more preferably 3:7 to 7:3 by mass.

The mixing ratio in the range of 2:8 to 8:2 by mass is preferable in that it improves the aging stability of drag force during excitation.

An absolute value of the difference in solubility parameters between the base oil and the silicone oil is preferably 1.3 $(cal/cm^3)^{1/2}$ or more, more preferably 1.5 $(cal/cm^3)^{1/2}$ or more, and especially preferably 1.8 $(cal/cm^3)^{1/2}$ or more. If the absolute value of the difference in solubility parameters between the base oil and the silicone oil is 1.3 $(cal/cm^3)^{1/2}$ or more, it is more preferable to improve the incompatibility between the base oil and the silicone oil.

5. Other Components

In addition to the above-mentioned components, the magnetic viscous fluid of the present embodiment may be combined with various other components according to the purpose, to the extent that the effect of the present invention is not impaired.

Other components include, for example, anti-wear agents, dispersants, surfactants, viscosity regulators, flow improvers, sedimentation inhibitors, flow point depressants, extreme pressure agents, rust inhibitors, oxidation inhibitors, corrosion inhibitors, metal inactivators, defoaming agents, and others.

The anti-wear agents include, for example, sulfur compounds such as sulfides, sulfoxides, sulfones, thiophosphinates, and others, halogenated compounds such as chlorinated hydrocarbons, and others, organometallic compounds such as molybdenum dithiophosphate (MoDTP), molybdenum dithiocarbamate (MoDTC), tricresyl phosphate, and others.

One type of the anti-wear agents may be used alone or in combination with two or more.

The dispersants are added to improve the dispersibility of the magnetic particles in the base oil, and include known low molecular weight dispersants and high molecular weight dispersants, and others. One type of the dispersants may be used alone, or two or more may be used in combination.

The viscosity regulators include, for example, castor oil, hydrogenated castor oil, fatty acid amides, beeswax, carnaba wax, benzylidene sorbitol, metal soap, polyethylene oxide, sulfate anionic activator, polyolefin, (meth)acrylic acid esters, polyisobutylene, ethylene-propylene copolymer, polyalkylstyrene, and others.

One type of the viscosity regulators may be used alone, or two or more may be used in combination.

The flow improvers include modified silicone oil. For example, straight silicone oil are modified with alkyl, aralkyl, polyether, higher fatty acid esters, amino, epoxy, carboxyl, alcohol, and others. The modified silicone oil may be compatible with the base oil. One type of flow improvers may be used alone, or two or more may be used in combination.

<Viscosity of Magnetic Viscous Fluid>

A viscosity of the magnetic viscous fluid of the present embodiment before excitation is preferably in the range of 0.03 to 1.0 Pa·s at 40° C., more preferably in the range of 0.03 to 0.6 Pa·s. The measurement conditions for the viscosity before excitation are as follows.

Inject 3 ml of the magnetic viscous fluid into a test plate of a TA Instruments rheometer DHR-2 equipped with the magnetic measurement option, and measure the viscosity (Pa·s) at 20 revolutions of a 100 μm gap under an atmosphere of 40° C.

<Magnetic Properties of Magnetic Viscous Fluids>

The magnetic viscous fluid of the present embodiment has the characteristics of high drag force during excitation (excellent drag force during excitation) and excellent aging stability of drag force. High drag force during excitation means that the maximum value of the viscosity of the magnetic viscous fluid of the present invention during excitation under the following conditions, when the content ratio of the magnetic particles in the total amount of the magnetic viscous fluid is ⅔ of mass ratio, is 230 Pa·s or more. The maximum value of the viscosity during excitation is preferably 230 Pa·s or more, and more preferably 240 Pa·s or more. The minimum value of the viscosity during excitation is preferably 200 Pa·s or more, and more preferably 210 Pa·s or more.

Excellent aging stability of drag force during excitation (viscosity aging stability) can be obtained by including the inorganic cation exchanger with siloxane bond and silicone oil. Excellent aging stability of drag force during excitation (viscosity aging stability) means that a stabilization ratio C, described below, is 90% or more. The stabilization ratio C is preferably 90% or more, a stabilization ratio B is more preferably 80% or more, a stabilization ration A is further more preferably 80% or more, and the stabilization ratio A is especially preferably 90% or more.

The viscosity during excitation is a viscosity during 210 seconds that the magnetic field is applied, using the same measuring device that measured the viscosity before excitation, and under the same temperature atmosphere, applying a magnetic field of 0.8 T DC 5 seconds after the start of measurement and stopping the application of that magnetic field 215 seconds after the start of measurement.

The stabilization ratio A to C (%), respectively, is calculated based on the following equation.

$$\text{Stabilization rate } A(\%) = (\text{Stabilization time } A/\text{Total applied time}) \times 100$$

The stabilization time A is the time of application corresponding to 97 to 100% of the maximum value of the viscosity during excitation.

The stabilization ratio B (%) is calculated based on the following formula.

$$\text{Stabilization rate } B(\%) = (\text{Stabilization time } B/\text{Total applied time}) \times 100$$

The stabilization time B is the time of application corresponding to 95 to 100% of the maximum value of the viscosity during excitation.

The stabilization ratio C (%) is calculated based on the following formula.

$$\text{Stabilization rate } C(\%) = (\text{Stabilization time } C/\text{Total applied time}) \times 100$$

The stabilization time C is the time of application corresponding to 90 to 100% of the maximum value of the viscosity during excitation.

(Method for Producing Magnetic Viscous Fluid)

A method for producing the magnetic viscous fluid of the present embodiment is not particularly limited. For example, magnetic particles, specific base oil, inorganic cation exchanger with siloxane bond, silicone oil, and other components added if desired, are all mixed in various quantities, using a homogenizer, bead mill, mechanical mixer, or other high shear force processing machine. The mixture may be heated or cooled as necessary in the production of the magnetic viscous fluid.

(Mechanical Device Comprising Magnetic Viscous Fluid)

The magnetic viscous fluid of the present embodiment has excellent drag force during excitation and excellent aging stability of drag force.

Therefore, the magnetic viscous fluid of the present embodiment can be applied to various mechanical devices such as brakes to control the frictional force between objects, clutches, and dampers of anti-vibration devices or vibration suppression devices.

EXAMPLES

The following examples of the present invention are provided to better understand the present invention and its advantages and are not intended to limit the invention.

Examples 1 to 14, Comparative Examples 1 to 6

Each of the components listed in Tables 1 to 3 was placed in a beaker based on the mass ratios listed therein and stirred at 40 Hz for 5 minutes at room temperature using a universal vibratory stirrer AD-MIX manufactured by Seiko Advance Inc. to produce magnetic viscous fluid. The raw materials for each component shown in Tables 1-3 are listed below.

(A) Magnetic Particle
  (a1) Carbonyl iron (average particle size D50=6.0 μm)
(B) Base Oil
<Hindered Ester>
  (b1) Trimethylolpropane trioctanoate (SP value: 9.1 $(cal/cm^3)^{1/2}$, kinematic viscosity at 40° C.: 16.0 $mm^2/s$, flash point 260° C., flow point −57° C.)
  (b2) Mixture of pentaerythritol-tetra-n-hexanoate and pentaerythritol-tetra-n-octanoate (SP value: 9.4 $(cal/cm^3)^{1/2}$, kinematic viscosity 24.8 $mm^2/s$ at 40° C., flash point 266° C., flow point −57° C.)
<Dibasic Acid Ester>
  (b3) Diisodecyl adipate (SP value: 8.9 $(cal/cm^3)^{1/2}$, kinematic viscosity at 40° C.: 14.2 $mm^2/s$, flash point: 232° C., flow point: −63° C.)
  (b4) Di(2-ethylhexyl) adipate (SP value: 8.9 $(cal/cm^3)^{1/2}$, kinematic viscosity at 40° C.: 7.8 $mm^2/s$, flash point: 205° C., flow point: −68° C.)
  (b5) Di(2-ethylhexyl) phthalate (SP value: 9.5 $(cal/cm^3)^{1/2}$, kinematic viscosity at 40° C.: 27.0 $mm^2/s$, flash point: 218° C., flow point: −55° C.)
<Polyalkylene Glycols>
  (b6) Polyoxyethylene dodecyl ether (SP value: 9.5 $(cal/cm^3)^{1/2}$, kinematic viscosity at 40° C.: 27.0 $mm^2/s$, flash point: 218° C., flow point: −55° C.)
<Alkylnaphthalene Having an Alkyl Group with 10 to 20 Carbons>
  (b7) Hexadecylnaphthalene (SP value: 9.2 $(cal/cm^3)^{1/2}$, kinematic viscosity at 40° C.: 29.0 $mm^2/s$, flash point: 222° C., flow point: −39° C.)
(C) Base Oils that do not Fall Under (B) Above
  (c1) Polyalpha olefin which is a trimer of 1-decene (SP value: 7.9 $(cal/cm^3)^{1/2}$, kinematic viscosity at 40° C.: 17.2 $mm^2/s$, flash point: 222° C., flow point: −68° C.)
  (c2) 1-Tetradecene (SP value: 8.0 $(cal/cm^3)^{1/2}$, flash point: 113° C.)
  (c3) Liquid paraffin (SP value: 7.9 $(cal/cm^3)^{1/2}$, kinematic viscosity at 40° C.: 7.8 $mm^2/s$, flash point: 162° C., flow point: −10.0° C.)
(D) Inorganic Cation Exchanger with Siloxane Bond
  (d1) Layered silicate (mineral type: smectite family, cation exchange capacity: 70 meq/100 g)
  (d2) Zeolite (crystal structure: mordenite type, cation exchange capacity: 160 to 190 meq/100 g)
  (d3) Talc (cation exchange capacity: 40 meq/100 g)
(E) Silicone Oil
  (e1) Dimethyl silicone oil (SP value: 7.2 $(cal/cm^3)^{1/2}$, kinematic viscosity at 40° C.: 37.8 $mm^2/s$)

<Evaluation of Viscosity Before and During Excitation>

3 ml of the magnetic viscous fluids of Examples and Comparative Examples were injected into the test plate of a TA Instruments rheometer DHR-2 equipped with the magnetic measurement option, and the viscosity (Pa·s) before excitation was measured at 20 revolutions per 100 μm gap under an atmosphere of 40° C. The viscosity during excitation was also measured using the same measuring device under the following conditions at 40° C.

Magnetic field excitation conditions: A magnetic field of 0.8 T DC was applied 5 seconds after the start of the measurement, and the application of that field was stopped 215 seconds after the start of the measurement.

Aging stability was evaluated by the stabilization rate A (%), stabilization rate B (%) and stabilization rate C (%) calculated based on the following formulas. The aging stability was evaluated for the minimum viscosity of 200 Pa·s or more during excitation.

$$\text{Stabilization rate } A(\%) = (\text{Stabilization time } A/\text{Total applied time}) \times 100$$

The stabilization time A is the time of application corresponding to 97 to 100% of the maximum value of the viscosity during excitation.

$$\text{Stabilization rate } B(\%) = (\text{Stabilization time } B/\text{Total applied time}) \times 100$$

The stabilization time B is the time of application corresponding to 95 to 100% of the maximum value of the viscosity during excitation.

$$\text{Stabilization rate } C(\%) = (\text{Stabilization time } C/\text{Total applied time}) \times 100$$

The stabilization time C is the time of application corresponding to 90 to 100% of the maximum value of the viscosity during excitation.

Test conditions and results are shown in Tables 1-3.

TABLE 1

| composition | | | | Ex. 1 (mass %) | Ex. 2 (mass %) | Ex. 3 (mass %) | Ex. 4 (mass %) | Comp. 1 (mass %) | Comp. 2 (mass %) | Comp. 3 (mass %) |
|---|---|---|---|---|---|---|---|---|---|---|
| prescription | (A) magnetic particle | | (a1) carbonyl iron | 20 | 20 | 20 | 20 | 20 | 28 | 20 |
| | (B) base oil | ester base synthetic oil | hindered ester | (b1) trimethylolpropane trioctanoate | 9 | 9 | 9 | | 9 | 9 | 10 |
| | | | dibasic acid ester | (b3) diisodecyl adipate | | | | 9 | | | |
| | (D) Inorganic cation exchanger with a siloxane bond | | (d1) layered silicate | 0.5 | | | 0.5 | 1 | 0 | |
| | | | (d2) zeolite | | 0.5 | | | | | |
| | | | (d3) talc | | | 0.5 | | | | |
| | (E) silicone oil | | (e1) dimethyl silicone oil | 0.5 | 0.5 | 0.5 | 0.5 | 0 | 1 | |

TABLE 1-continued

| | composition | | Ex. 1 (mass %) | Ex. 2 (mass %) | Ex. 3 (mass %) | Ex. 4 (mass %) | Comp. 1 (mass %) | Comp. 2 (mass %) | Comp. 3 (mass %) |
|---|---|---|---|---|---|---|---|---|---|
| experimental results | viscosity during excitation (0.8T, 40° C., Pa · s) | maximum value | 250.1 | 257.3 | 238.6 | 242.0 | 264.1 | 265.2 | 277.5 |
| | | minimum value | 210.1 | 219.9 | 200.8 | 203.0 | 205.3 | 196.6 | 238.8 |
| | stabilization ratio | stabilization ratio A (%) | 82.4 | 98.1 | 77.6 | 22.9 | | | |
| | | stabilization ratio B (%) | | | | 94.3 | 43.3 | | |
| | | stabilization ratio C (%) | | | | 96.2 | 69.5 | 64.3 | 63.3 |
| | viscosity before excitation (0T, 40° C., Pa · s) | | 0.37 | 0.09 | 0.06 | 0.59 | 1.99 | 0.05 | 0.06 |

TABLE 2

| | composition | | Ex. 5 (mass %) | Ex. 6 (mass %) | Ex. 2 (mass %) | Ex. 7 (mass %) | Ex. 8 (mass %) |
|---|---|---|---|---|---|---|---|
| prescription | (A) magnetic particle | (a1) carbonyl iron | 20 | 20 | 20 | 20 | 20 |
| | (B) base oil  ester base synthetic oil  hindered ester | (b1) trimethylolpropane trioctanoate | 9 | 9 | 9 | 9 | 8.5 |
| | (D) inorganic cation exchanger with a siloxane bond | (d2) zeolite | 0.3 | 0.4 | 0.5 | 0.8 | 1 |
| | (E) silicone oil | (e1) dimethyl silicone oil | 0.7 | 0.6 | 0.5 | 0.2 | 0.5 |
| experimental results | viscosity during excitation (0.8T, 40° C., Pa · s) | maximum value | 254.6 | 257.8 | 257.3 | 267.7 | 274.6 |
| | | minimum value | 208.6 | 210.4 | 219.9 | 231.6 | 232.7 |
| | stabilization ratio | stabilization ratio A (%) | 97.1 | 98.5 | 98.1 | 97.1 | 94.8 |
| | viscosity before excitation (0T, 40° C., Pa · s) | | 0.04 | 0.07 | 0.09 | 0.13 | 0.16 |

TABLE 3

| | composition | | | Ex. 7 (mass %) | Ex. 9 (mass %) | Ex. 10 (mass %) | Ex. 11 (mass %) | Ex. 12 (mass %) | Ex. 13 (mass %) | Ex. 14 (mass %) | Comp. 4 (mass %) | Comp. 5 (mass %) | Comp. 6 (mass %) |
|---|---|---|---|---|---|---|---|---|---|---|---|---|---|
| prescription | (A) magnetic particle | | (a1) carbonyl iron | 20 | 20 | 20 | 20 | 20 | 20 | 20 | 20 | 20 | 20 |
| | (B) base oil | ester base synthetic oil | hindered ester | (b1) trimethylolpropane trioctanoate | 9 | | | | | | | | | |
| | | | | (b2) mixture of penta erythritol-tetra-n-hexanoate and pentaerythritol-tetra-n-octanoate | | 9 | | | | | | | | |
| | | | dibasic acid ester | (b3) diisodecyl adipate | | | 9 | | | | | | | |
| | | | | (b4) di(2-ethylhexyl) adipate | | | | 9 | | | | | | |
| | | | | (b5) di(2-ethylhexyl) phthalate | | | | | 9 | | | | | |
| | | ether base synthetic oil | polyalkylene glycol | (b6) polyoxyethylene dodecyl ether | | | | | | 9 | | | | |
| | | Alkylnaphthalene having an alkyl group with 10 to 20 carbons | | (b7) hexadecylnaphthalene | | | | | | | 9 | | | |
| | (C) Base oils that do not fall under (B) | | | (c1) polyalpha olefin which is a trimer of 1-decene | | | | | | | | 9 | | |
| | | | | (c2) 1-tetradecene | | | | | | | | | 9 | |
| | | | | (c3) liquid paraffin | | | | | | | | | | 9 |
| | (D) Inorganic cation exchanger with siloxane bond | | | (d2) zeolite | 0.5 | 0.5 | 0.5 | 0.5 | 0.5 | 0.5 | 0.5 | 0.5 | 0.5 | 0.5 |
| | (E) silicone oil | | | (e1) dimethyl silicone | 0.5 | 0.5 | 0.5 | 0.5 | 0.5 | 0.5 | 0.5 | 0.5 | 0.5 | 0.5 |
| experimental results | viscosity during excitation (0.8 T, 40° C., Pa · s) | | | maximum value | 257.3 | 285.7 | 254.5 | 264.9 | 250.8 | 280.9 | 240.2 | 214.6 | 246.1 | 273.8 |
| | | | | minimum value | 219.9 | 253.7 | 203.5 | 205.4 | 222.1 | 227.1 | 202.0 | 158.5 | 185.2 | 174.1 |
| | | | | stabilization ratio | | | | | | | | | | |
| | | | | stabilization ratio A (%) | 98.1 | 25.2 | 78.1 | 82.4 | 7.6 | 12.9 | 71.4 | untested | untested | untested |
| | | | | stabilization ratio B (%) | | 43.3 | 88.6 | | 81.4 | 97.6 | 83.8 | untested | untested | untested |
| | | | | stabilization ratio C (%) | | 99.5 | | | | | | untested | untested | untested |
| | viscosity before excitation (0 T, 40° C, Pa · s) | | | | 0.09 | 0.11 | 0.05 | 0.07 | 0.11 | 0.01 or below | 0.07 | 0.02 | 0.01 or below | 0.04 |

The magnetic viscous fluids of Examples 1-14 were all magnetic viscous fluids containing a magnetic particle, at least one selected from ester base synthetic oil, ether base synthetic oil, and alkylnaphthalene having an alkyl group with 10 to 20 carbons, an inorganic cation exchanger with a siloxane bond, and silicone oil. Therefore, the maximum value of viscosity during excitation was 230 Pa·s or more, and the stabilization ratio C was 90% or more, all of which had excellent drag force during excitation and excellent aging stability of drag force.

On the other hand, the magnetic viscous fluids of Comparative Example 1 did not contain silicone oil, the magnetic viscous fluids of Comparative Example 2 did not contain an inorganic cation exchanger with a siloxane bond, and the magnetic viscous fluids of Comparative Example 3 did not contain silicone oil and an inorganic cation exchanger, and the stabilization ratio C was less than 90% in all cases.

The magnetic viscous fluids of Comparative Examples 4-6 did not contain at least one selected from ester base synthetic oil, ether base synthetic oil, and alkylnaphthalene having an alkyl group with 10 to 20 carbons, so the minimum value of viscosity during excitation was lower than in the Examples and less than 200 Pa·s. For this reason, the stabilization rates of Comparative examples 4-6 were not evaluated.

Figure 3:
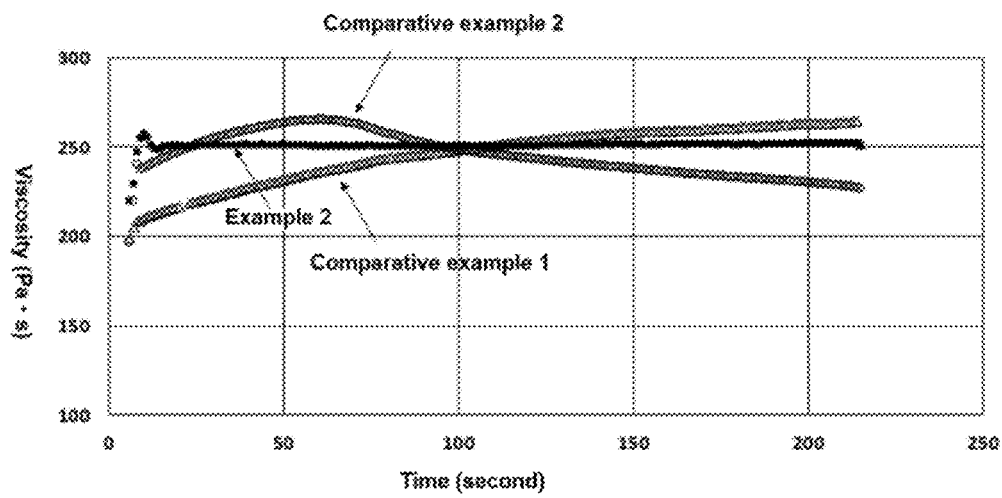
FIG. 3 shows the relationship between elapsed time and viscosity in Example 2, Comparative Example 1, and Comparative Example 2.

FIG. 3 is a graph showing the relationship between elapsed time and viscosity in magnetic viscous fluids of Example 2, Comparative Example 1, and Comparative Example 2. From the graph in FIG. 3, it can be seen that Example 2 has superior aging stability of drag force compared to Comparative Examples 1 and 2.

Figure 4:
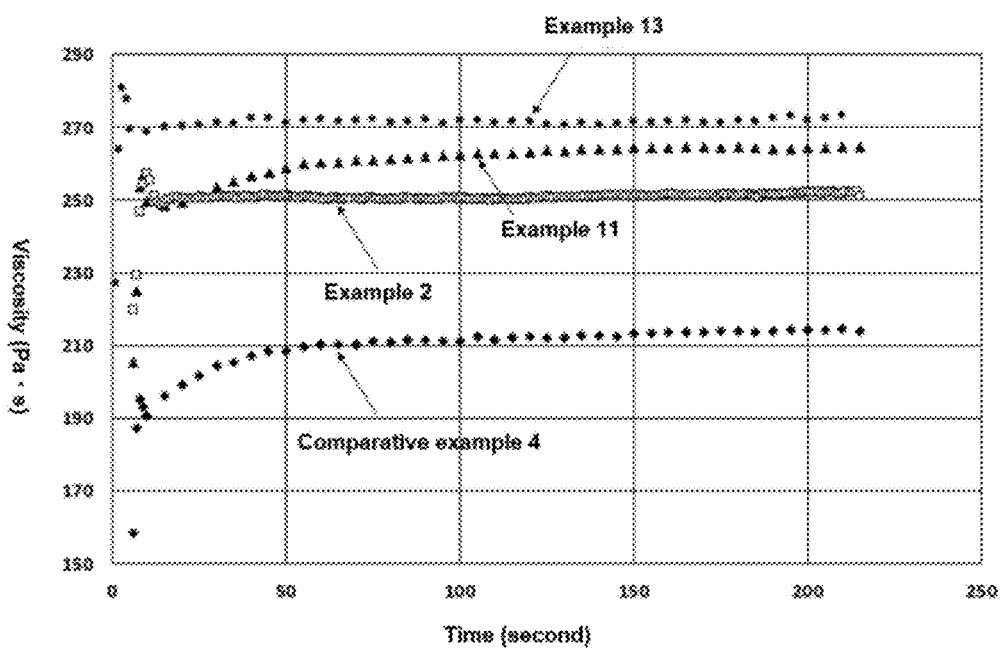
FIG. 4 shows the relationship between elapsed time and viscosity in Example 2, Example 11, Example 13, and Comparative Example 4.

FIG. 4 is a graph showing the relationship between elapsed time and viscosity in magnetic viscous fluids of Example 2, Example 11, Example 13, and Comparative Example 4. From the graph in FIG. 4, it can be seen that the maximum drag force in Examples 2, 11, and 13 is larger than that in Comparative Example 4, and that they also have superior aging stability.

DESCRIPTION OF REFERENCE NUMERALS 1 magnetic particle
2 hindered ester
3 inorganic cation exchanger with a siloxane bond
4 dimethyl silicone oil

The invention claimed is:

1. A magnetic viscous fluid comprising:
a magnetic particle,
at least one selected from ester base synthetic oil, ether base synthetic oil, and alkylnaphthalene having an alkyl group with 10 to 20 carbons,
an inorganic cation exchanger with a siloxane bond, and silicone oil,
wherein the ester base synthetic oil is at least one selected from polyol ester and dibasic acid ester,
the ether base synthetic oil is polyalkylene glycols,
a mixing ratio of the inorganic cation exchanger with a siloxane bond and the silicone oil is in a range of 2:8 to 8:2 by mass, and
the inorganic cation exchanger with a siloxane bond is at least one selected from zeolite, bentonite, montmorillonite, bidelite, nontronite, hectorite, stevensite and kaolinite.

2. The magnetic viscous fluid according to claim 1, wherein the polyol ester is hindered ester.

3. The magnetic viscous fluid according to claim 1, wherein the dibasic acid ester is aliphatic dibasic acid ester.

4. The magnetic viscous fluid according to claim 3, wherein the aliphatic dibasic acid ester is ester of aliphatic dicarboxylic acid with 2 to 10 carbons and alcohol with 1 to 10 carbons.

5. The magnetic viscous fluid according to claim 1, wherein the polyalkylene glycols are at least one selected from the group consisting of compounds represented by the following formula (1);

$$R^1-O-(R^2-O)_n-R^3 \qquad (1)$$

[in the formula (1), $R^1$ and $R^3$ may be the same or different, each indicating a hydrogen atom or an alkyl group with 1 to 18 carbons, $R^2$ indicates an alkylene group with 2 to 4 carbons, and n indicates an integer from 2 to 30].

6. A mechanical device comprising the magnetic viscous fluid according to claim 1.

* * * * *